US009528616B2

(12) United States Patent
Nishiyama et al.

(10) Patent No.: US 9,528,616 B2
(45) Date of Patent: Dec. 27, 2016

(54) FIVE-PORT SWITCHING VALVE WITH RESIDUAL PRESSURE EXHAUST VALVE

(71) Applicant: SMC CORPORATION, Chiyoda-ku (JP)

(72) Inventors: Tatsuya Nishiyama, Noda (JP); Takashi Murakami, Moriya (JP); Shinji Miyazoe, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 95 days.

(21) Appl. No.: 14/445,591

(22) Filed: Jul. 29, 2014

(65) Prior Publication Data

US 2015/0059893 A1    Mar. 5, 2015

(30) Foreign Application Priority Data

Aug. 28, 2013  (JP) ................................. 2013-177183

(51) Int. Cl.
*F15B 20/00* (2006.01)
*F16K 11/10* (2006.01)
(Continued)

(52) U.S. Cl.
CPC ........... *F16K 11/10* (2013.01); *F15B 13/0892* (2013.01); *F15B 20/00* (2013.01); *F16K 11/07* (2013.01);
(Continued)

(58) Field of Classification Search
CPC ...... F16K 11/0712; F16K 15/18; F16K 11/07; F16K 11/10; F15B 13/02
(Continued)

(56) References Cited

U.S. PATENT DOCUMENTS 3,294,120 A * 12/1966 Ruchser .............. F15B 13/0405
137/596.16
3,532,119 A * 10/1970 Lind ....................... F15B 13/02
137/596
(Continued)

FOREIGN PATENT DOCUMENTS

CN    2197500 Y     5/1995
JP    5-126110 A    5/1993
(Continued)

OTHER PUBLICATIONS

Combined Taiwanese Office Action and Search Report issued Nov. 13, 2015 in Patent Application No. 103126745 (with English language translation).
(Continued)

*Primary Examiner* — Jessica Cahill
*Assistant Examiner* — Angelisa L Hicks
(74) *Attorney, Agent, or Firm* — Oblon, McClelland, Maier & Neustadt, L.L.P.

(57) ABSTRACT

A switching valve includes main valve constituted of a five-port electromagnetic switching valve settable to a closed-center position, and a residual pressure exhaust valve including an exhaust valve cavity communicating with a supply port of the main valve and two exhaust ports, two residual pressure discharge flow paths respectively communicating with the exhaust ports, two exhaust valve elements placed inside the exhaust valve cavity and driven by pressure air from the supply port to open and close the residual pressure discharge flow paths, and a release spring that biases the exhaust valve element in a direction to open the residual pressure discharge flow paths. While the pressure air is not supplied into the exhaust valve cavity through the supply port, the exhaust valve element opens the residual pressure discharge flow paths so as to discharge residual pressure from the exhaust port, and when pressure air is
(Continued)

supplied into the exhaust valve cavity the exhaust valve element closes the residual pressure discharge flow path, and hence the residual pressure is not discharged from the exhaust port.

9 Claims, 4 Drawing Sheets

(51) Int. Cl.
*F16K 15/18* (2006.01)
*F16K 11/07* (2006.01)
*F15B 13/08* (2006.01)

(52) U.S. Cl.
CPC ........ *F16K 15/18* (2013.01); *Y10T 137/87233* (2015.04)

(58) Field of Classification Search
USPC ............ 137/596.18, 596.1, 596.16, 625.25,137/625.64, 625.66, 625.69; 251/282, 321
See application file for complete search history.

(56) References Cited

U.S. PATENT DOCUMENTS

| | | | | |
|---|---|---|---|---|
| 3,870,073 | A | | 3/1975 | Ruchser et al. |
| 4,293,001 | A | * | 10/1981 | Budzich ............... F15B 11/165 137/596.1 |
| 4,411,189 | A | * | 10/1983 | Miller ................. F15B 13/0417 137/596 |
| 4,488,474 | A | * | 12/1984 | Budzich .............. F15B 11/0445 137/596.1 |
| 4,688,470 | A | * | 8/1987 | Budzich ................ E02F 9/2225 137/596.1 |
| 5,000,001 | A | * | 3/1991 | Christensen ........ F15B 13/0417 137/596 |
| 5,785,087 | A | * | 7/1998 | Takahashi ........... F15B 13/0402 137/238 |
| 5,868,157 | A | * | 2/1999 | Yoshimura .......... F15B 13/0402 137/269 |
| 6,026,856 | A | * | 2/2000 | Miyazoe ............. F15B 13/0402 137/596.16 |
| 8,567,443 | B2 | | 10/2013 | Miyazoe et al. |
| 2006/0237068 | A1 | * | 10/2006 | Miyazoe ............. F15B 13/0431 137/596.16 |
| 2007/0193639 | A1 | | 8/2007 | Ling et al. |
| 2011/0193000 | A1 | * | 8/2011 | Miyazoe ................ F15B 11/064 251/129.01 |

FOREIGN PATENT DOCUMENTS

| | | |
|---|---|---|
| JP | 2004-100948 A | 4/2004 |
| JP | 2010-249186 A | 11/2010 |

OTHER PUBLICATIONS

Japanese Office Action issued Nov. 24, 2015 in Patent Application No. 2013-177183 (with English translation).

* cited by examiner

FIVE-PORT SWITCHING VALVE WITH RESIDUAL PRESSURE EXHAUST VALVE

BACKGROUND OF THE INVENTION

1. Field of the Invention

The present invention relates to a five-port switching valve with residual pressure exhaust valve including a five-port electromagnetic switching valve and a residual pressure exhaust valve that automatically discharges residual pressure remaining in a fluid pressure circuit to and from which pressure air is supplied and discharged via the switching valve, the residual pressure exhaust valve constituting a safety circuit that prevents malfunction or unexpected behavior of the fluid pressure apparatus due to the residual pressure.

2. Description of the Related Art

In a general-purpose five-port electromagnetic switching valve of a closed-center type includes, for example, a valve cavity penetrating through the main valve body. A central supply flow path, a pair of output flow paths located on the respective sides of the central supply flow path, and a pair of discharge flow paths located on the side of the respective end portions of the valve cavity from the respective discharge flow paths, each have an opening in the valve cavity. The supply flow path is disposed to communicate with a supply port having an opening on the outer face of the main valve body, and the output flow paths on the respective sides of the supply flow path are disposed to respectively communicate with a pair of output ports of the main valve body, and further the discharge flow paths located beside the respective output flow paths are disposed to respectively communicate with a pair of discharge ports of the main valve body.

A main valve element, with an annular seal member formed of an elastic material attached therearound, is slidably fitted inside the valve cavity, and the main valve element is driven with fluid pressure operational force exerted on one of pistons to be made to abut the respective end portions of the main valve element, so as to set the main valve element valve cavity at one of two switching positions. One is a first switching position in which the supply port is set to communicate with one of the output ports and the other output port is set to communicate with the discharge port, and a second switching position in which, contrary to the above, the supply port is set to communicate with the other output port and the first mentioned output port is set to communicate with the discharge port. The main valve element can also be set to a neutral position in which all of the flow paths in the valve cavity are restricted from communicating with any other flow paths by biasing force of a spring exerted on the main valve element, in the case where the fluid pressure operational force is not exerted on any of the pistons.

In the five-port switching valve settable to the closed-center position (neutral position), fluid pressure is supplied from the supply port to one of the output ports so as to operate a fluid pressure apparatus connected to the output port. When the main valve element is reset to the neutral position to stop the operation of the fluid pressure apparatus, the pressure air which has thus far been operating the fluid pressure apparatus through the five-port switching valve is enclosed as residual pressure on the side of the fluid pressure circuit. In case that the residual pressure is discharged owing to an unexpected situation, the fluid pressure apparatus in which the residual pressure has been enclosed may malfunction or make an unexpected behavior thus incurring a dangerous situation, and therefore the residual pressure has to be discharged in advance in order to avoid such danger.

SUMMARY OF INVENTION

A technical object of the present invention is to provide a five-port switching valve with residual pressure exhaust valve of a simplified structure, in which the main valve is constituted of the five-port switching valve settable to the closed-center position, the five-port switching valve being configured to allow, when the main valve element of the main valve is at the closed-center position and the residual pressure in the fluid pressure circuit communicating with the output ports of the main valve is desired to be discharged, the residual pressure to be discharged by cutting off the supply of the pressure air to the supply port of the main valve, thereby constituting a safety circuit that prevents malfunction or unexpected behavior of the fluid pressure apparatus due to the residual pressure.

In an aspect, the present invention provides a five-port switching valve with residual pressure exhaust valve, including a main valve constituted of a five-port electromagnetic switching valve settable to a closed-center position and a residual pressure exhaust valve attached to the main valve. The residual pressure exhaust valve includes, in an exhaust valve cavity formed in an exhaust valve body, two residual pressure discharge flow paths respectively communicating with two output ports of the main valve so as to open the output ports to ambient air, two exhaust valve elements configured to contact and move away from a residual pressure exhaust valve seat of the respective residual pressure discharge flow paths to open and close the respective residual pressure discharge flow paths, a release spring that biases each of the exhaust valve elements in a direction away from the residual pressure exhaust valve seat, and a drive pressure chamber formed in the exhaust valve cavity at a position between the exhaust valve elements and communicating with the supply port of the main valve. When air is supplied through the supply port into the drive pressure chamber, the exhaust valve elements are caused to contact the respective residual pressure exhaust valve seats resisting the biasing force of the release spring so as to close the residual pressure discharge flow paths, and when air is not supplied through the supply port into the drive pressure chamber the exhaust valve elements are moved away from the respective residual pressure exhaust valve seats owing to the biasing force of the release spring so as to open the residual pressure discharge flow path.

In the present invention, the main valve may include the supply port located at a central position and communicating with a main valve cavity formed in a main valve body, the output ports located on respective sides of the supply port and communicating with the main valve cavity, two exhaust ports located on the side of respective end portions of the valve cavity from the respective output ports and communicating with the main valve cavity, a main valve element slidably inserted in the main valve cavity, a drive mechanism that drives the main valve element to a first switching position and a second switching position, and a return spring that returns the main valve element to a neutral position. In the first switching position, the supply port is set to communicate with one of the output ports and the other output port is set to communicate with one of the exhaust ports, and in the second switching position the supply port is set to communicate with the other output port and the first mentioned one of the output ports is set to communicate with the other exhaust port, and in the neutral position all the ports are closed.

The drive mechanism may include two pistons to be made to abut the respective end portions of the main valve element, and two pilot electromagnetic valves that introduce pilot air into pressure chambers formed on one side of the respective pistons.

In the present invention, preferably, the main valve body may include a mounting seat formed on an outer face for mounting the exhaust valve body, and a supply communication port communicating with the supply port and two discharge communication ports respectively communicating with the output ports may be opened in the mounting seat. The exhaust valve body may include a mounting surface to be made to abut the mounting seat, and a supply via hole communicating with the supply communication port and two residual pressure discharge via holes respectively communicating with the discharge communication ports may be opened in the mounting surface.

It is preferable that the exhaust valve cavity of the residual pressure exhaust valve and the main valve cavity of the main valve are parallel to each other.

In another aspect, the present invention provides a five-port switching valve with residual pressure exhaust valve, in which the main valve includes a main valve body including a supply port, two output ports, and two exhaust ports, a main valve cavity formed inside the main valve body so as to allow all the ports to communicate, a main valve element movably placed inside the main valve cavity to open and close a flow path between adjacent ones of the ports, and a pilot electromagnetic valve that drives the main valve element. The residual pressure exhaust valve includes an exhaust valve body attached to the main valve body, an exhaust valve cavity formed inside the exhaust valve body, two exhaust valve elements provided inside the exhaust valve cavity so as to oppose each other, a supply via hole located between the exhaust valve elements so as to allow the exhaust valve cavity to communicate with the supply port, two residual pressure discharge via holes located on respective sides of the supply via hole so as to allow communication between the respective exhaust ports and the exhaust valve cavity, a disconnection seal member attached to each of the exhaust valve elements so as to disconnect communication between the supply via hole and one of the residual pressure discharge via holes, two residual pressure discharge flow paths that open the respective residual pressure discharge via holes to ambient air, residual pressure exhaust valve seats respectively formed in the residual pressure discharge flow paths and which the exhaust valve element is made to contact and move away from, and a release spring that biases the exhaust valve element in a direction away from the residual pressure exhaust valve seat.

The exhaust valve elements may include a recessed portion formed on respective end faces opposing each other, the recessed portion constituting a drive pressure chamber between the exhaust valve elements to introduce air from the supply port.

Preferably, the exhaust valve cavity of the residual pressure exhaust valve may include a larger-diameter cavity located at a central portion in a direction of an axial line and two smaller-diameter cavities located at respective end portions in the direction of the axial line, the larger-diameter cavity being larger in diameter than the smaller-diameter cavities. The supply via hole and the residual pressure discharge via holes may communicate with the larger-diameter cavity, and the smaller-diameter cavities may respectively include the residual pressure discharge flow paths, and the residual pressure exhaust valve seats formed in an inner end portion of the respective smaller-diameter cavities. The exhaust valve elements may each include a larger-diameter valve placed in the larger-diameter cavity and a smaller-diameter valve placed in the smaller-diameter cavity, the larger-diameter valve being larger in diameter than the smaller-diameter valve. The disconnection seal member may be attached to an outer periphery of the larger-diameter valve, and an open-close seal member to be made to contact and move away from the residual pressure exhaust valve seat may be attached to an inner end portion of the smaller-diameter valve.

Further, the main valve body may include a mounting seat formed on an outer face for mounting the exhaust valve body, the mounting seat including an opening of a supply communication port communicating with the supply port and an opening of each of two discharge communication ports respectively communicating with the output ports, and the exhaust valve body may include a mounting surface to be made to abut the mounting seat, the mounting surface including an opening of the supply via hole communicating with the supply communication port and an opening of each of the residual pressure discharge via holes respectively communicating with the discharge communication ports.

The five-port switching valve with residual pressure exhaust valve configured as above according to the present invention enables, when the main valve element of the main valve, constituted of the five-port switching valve settable to the closed-center position, is at the closed-center position and the residual pressure in the fluid pressure circuit communicating with the output ports of the main valve is desired to be discharged, the residual pressure to be discharged by cutting off the supply of the pressure air to the supply port of the main valve, thereby allowing the residual pressure exhaust valve to serve as a safety circuit that prevents malfunction or unexpected behavior of the fluid pressure apparatus due to the residual pressure.

DESCRIPTION OF EMBODIMENTS

Figure 1:
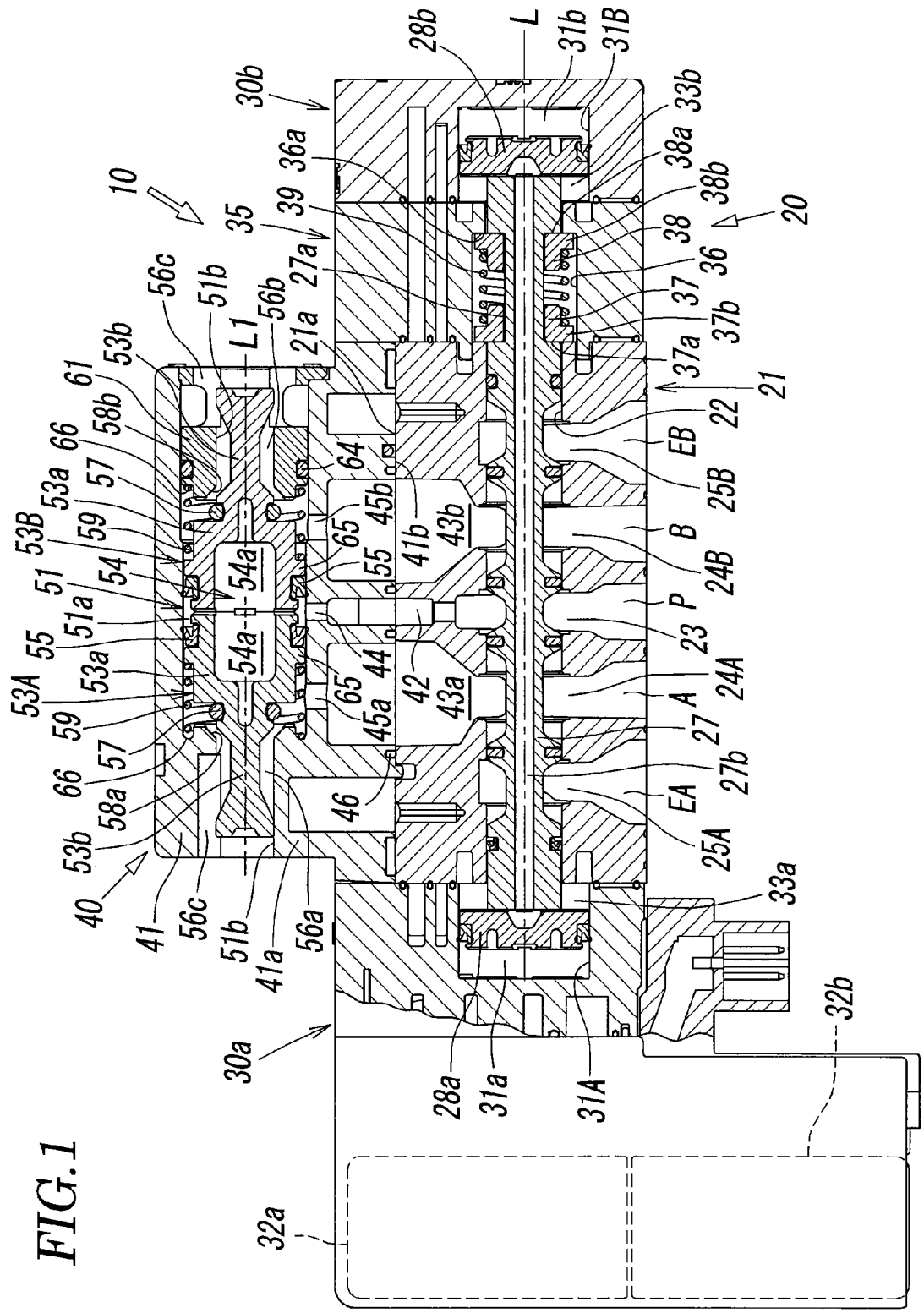
FIG. 1 is a fragmentary vertical cross-sectional view showing a general configuration of a five-port switching valve with residual pressure exhaust valve according to an embodiment of the present invention.
Figure 2:
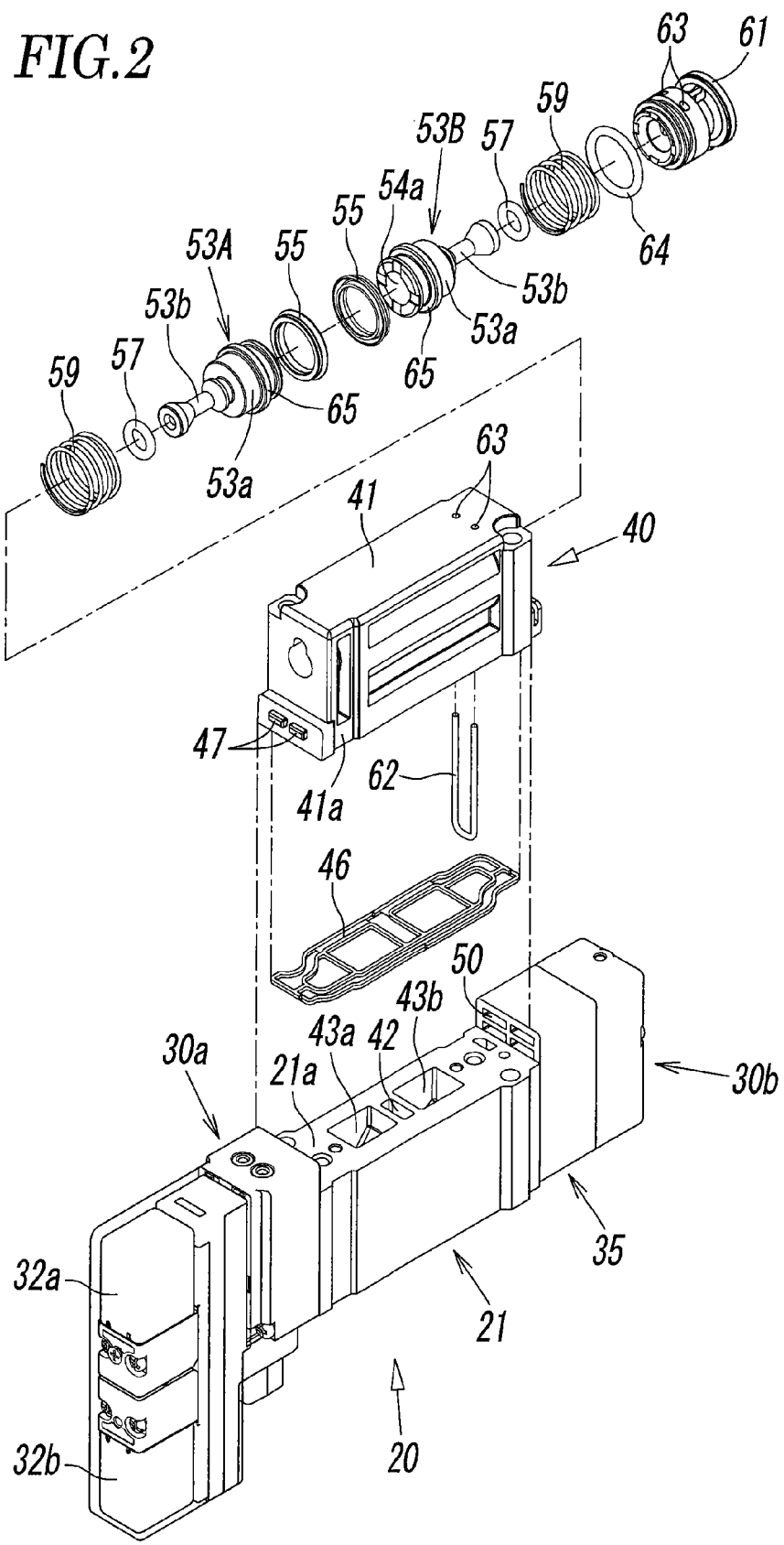
FIG. 2 is an exploded perspective view showing an essential part of the five-port switching valve according to the embodiment, with the pilot electromagnetic valve exposed.

FIG. 1 illustrates a five-port switching valve with residual pressure exhaust valve 10 according to an embodiment of the present invention, and FIG. 2 explicitly illustrates the internal structure, in particular the internal structure of a residual pressure exhaust valve 40 mounted on a main valve 20. The main valve 20 is, as will be described below in details, constituted of a known five-port electromagnetic switching valve settable to a closed-center position.

The five-port switching valve with residual pressure exhaust valve 10 includes the main valve 20 and the residual pressure exhaust valve 40 mounted thereon. The main valve 20 includes a main valve body 21, a supply port P formed in the main valve body 21, a first and second output ports A, B, a first and second exhaust ports EA, EB, and a main valve cavity 22 penetrating through the main valve body 21. A supply flow path 23, a first and second output flow paths 24A, 24B, and a first and second exhaust flow paths 25A, 25B are disposed to communicate with the main valve cavity 22. To be more detailed, the supply flow path 23 connected to the supply port P communicates with a central portion of the main valve cavity 22 in a direction of an axial line L, and the first output flow path 24A connected to the first output port A and the second output flow path 24B connected to the second output port B communicate with positions on the respective sides of the supply flow path 23 of the main valve cavity 22, and further the first exhaust flow path 25A connected to the first exhaust port EA and the second exhaust flow path 25B connected to the second exhaust port EB communicate with positions on the side of the respective end portions of the valve cavity from the first and second output flow paths 24A, 24B in the main valve cavity 22, and a main valve element 27 for switching the flow path is inserted in the main valve cavity 22 so as to slide along the axial line L.

A first piston box 30a is connected to an end portion of the main valve body 21 in the direction of the axial line L, and a first piston 28a abutted against an end portion of the main valve element 27 so as to drive the main valve element and is accommodated in a first piston chamber 31A formed in the first piston box 30a. A second piston box 30b is connected to the other end portion of the main valve body 21 via an adapter block 35, and a second piston 28b abutted against the other end portion of the main valve element 27 so as to drive the main valve element and is accommodated in a second piston chamber 31B formed in the second piston box 30b. The first piston 28a and the second piston 28b have the same diameter.

Inside the first piston chamber 31A and the second piston chamber 31B, a first pressure chamber 31a and a second pressure chamber 31b are defined by the first piston 28a and the second piston 28b, respectively, and the first pressure chamber 31a and the second pressure chamber 31b respectively communicate with a pilot output port (not shown) of the first pilot electromagnetic valve 32a and the second pilot electromagnetic valve 32b fixed to the first piston box 30a, as shown in FIGS. 1 and 2.

When power is supplied to the first pilot electromagnetic valve 32a with the second pilot electromagnetic valve 32b disconnected, pilot air from the pilot output port of the first pilot electromagnetic valve 32a is introduced in the first pressure chamber 31a through a path (not shown) in the first piston box 30a in which the first piston 28a is located, and the second pressure chamber 31b is opened to ambient air through the second pilot electromagnetic valve 32b. Accordingly, the pilot air presses the main valve element 27 via the first piston 28a, and the main valve element 27 moves to a first switching position at the right-hand end in FIG. 1. Therefore, the supply port P is set to communicate with the first output port A through the supply flow path 23, the main valve cavity 22, and the first output flow path 24A, so that pressure air is supplied to the fluid pressure circuit connected to the first output port A, while the second output port B is set to communicate with the second exhaust port EB through the second output flow path 24B, the main valve cavity 22, and the second exhaust flow path 25B, so that pressure air in the fluid pressure circuit connected to the second output port B is discharged.

Conversely, when power is supplied to the second pilot electromagnetic valve 32b with the first pilot electromagnetic valve 32a disconnected, the pilot air in the first pressure chamber 31a is discharged to ambient air through the first pilot electromagnetic valve 32a, and the pilot air from the pilot output port of the second pilot electromagnetic valve 32b is introduced in the second pressure chamber 31b through the first piston box 30a, the main valve body 21, the adapter block 35 for a return mechanism, and a path (not shown) in the second piston box 30b. Accordingly, the pilot air presses the main valve element 27 via the second piston 28b, and the main valve element 27 moves to a second switching position at the left-hand end in FIG. 1. Therefore, the supply port P is set to communicate with the second output port B through the supply flow path 23, the main valve cavity 22, and the second output flow path 24B, so that pressure air is supplied to the fluid pressure circuit connected to the second output port B, while the first output port A is set to communicate with the first exhaust port EA through the first output flow path 24A, the main valve cavity 22, and the first exhaust flow path 25A, so that pressure air in the fluid pressure circuit connected to the first output port A is discharged.

Thus, upon supplying power to one of the pilot electromagnetic valves 32a, 32b the pilot air is introduced into one of the pressure chambers 31a, 31b from the corresponding output port, and upon disconnecting the other pilot electromagnetic valve the pilot air in the other pressure chamber is discharged through the pilot discharge port, and therefore the main valve element 27 moves in the main valve cavity 22 to one of the first and second switching positions. The mentioned operation is the same as the operation of a known two-position five-port electromagnetic switching valve.

The main valve element 27 includes a through hole 27b formed through a central portion thereof. The through hole 27b allows back pressure chambers 33a, 33b, respectively formed between the first piston 28a and an end face of the main valve body 21 and between the second piston 28b and the other end face of the main valve body 21, to communicate with each other, to thereby release the air in one of the back pressure chambers to the other back pressure chamber when the pistons 28a, 28b are moved.

Figure 3:
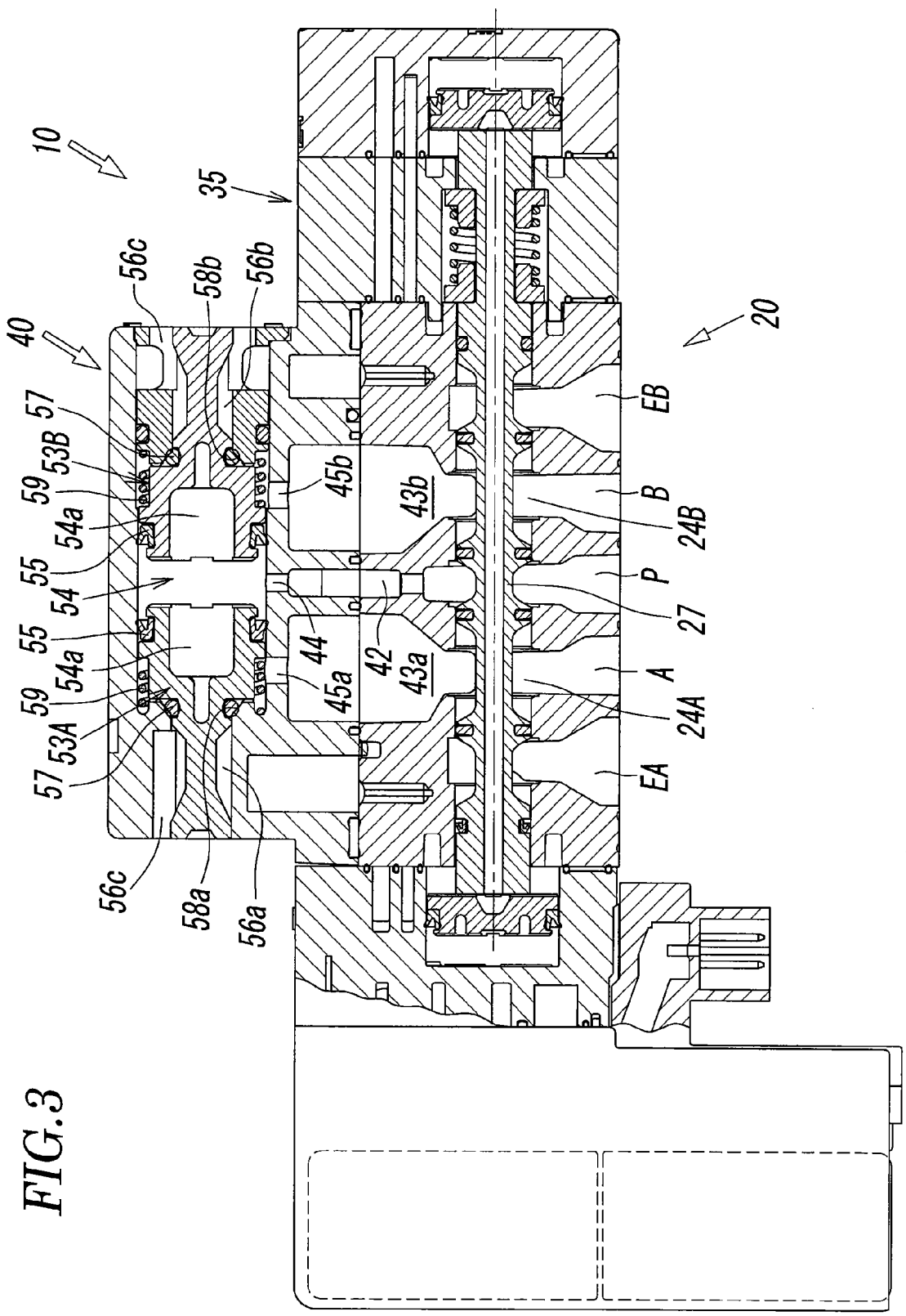
FIG. 3 is a fragmentary cross-sectional view showing the five-port switching valve according the embodiment, to the supply port of which air is being supplied.

When the pressure air is supplied to the supply port P the residual pressure exhaust valve 40 is set to an operating position shown in FIG. 3 by the pressure air as described above, the details of which will be subsequently described.

The adapter block 35 includes the return mechanism that returns the main valve element 27 to a neutral position when the pilot electromagnetic valves 32a, 32b are disconnected. The adapter block 35 is air-tightly attached between the main valve body 21 and the second piston box 30b via a seal member, and includes a via hole 36 with a stepped portion 36a communicating with the main valve cavity 22 of the main valve body 21. The main valve element 27 is inserted through the via hole 36, and the end portion of the main valve element 27 is abutted against the second piston 28b in the second piston box 30b.

The main valve element 27 includes a fine-diameter portion 27a, smaller in diameter than the portion of the main valve cavity 22 where the main valve element 27 is to slide over, formed at the position corresponding to the via hole 36. A first and second spring bases 37, 38 each having an annular shape are attached to the fine-diameter portion 27a, and a return spring 39 is interposed between flange portions 37b, 38b respectively formed on the spring bases 37, 38, in a compressed state. In the first spring base 37 located on the side of the main valve body 21, a radially outer portion of an abutment surface 37a on the outer face of the flange portion 37b is opposed to an end face of the main valve body 21, and a radially inner portion of the abutment surface 37a is opposed to the stepped portion on an end portion of the fine-diameter portion 27a in the main valve element 27. In the second spring base 38 located on the side of the second piston box 30b, a radially outer portion of an abutment surface 38a on the outer face of the flange portion 38b is opposed to the stepped portion 36a formed at an end portion of the via hole 36 in the adapter block 35, and a radially inner portion of the abutment surface 38a is opposed to the stepped portion formed at the other end portion of the fine-diameter portion 27a.

The return mechanism of the main valve element 27 is configured as above, and therefore when the pilot air is introduced into the first pressure chamber 31a by supplying power to the first pilot electromagnetic valve 32a and the first piston 28a switches the main valve element 27 to the first switching position, the main valve element 27 presses and displaces the first spring base 37. Accordingly, the return spring 39 is compressed so that energy for returning is accumulated, and when the first pilot electromagnetic valve 32a is disconnected the main valve element 27 is returned to the neutral position shown in FIG. 1, via the first spring base 37 pressed by the elastic force of the return spring 39.

Conversely, when the pilot air is introduced into the second pressure chamber 31b by supplying power to the second pilot electromagnetic valve 32b and the second piston 28b switches the main valve element 27 to the second switching position, the main valve element 27 presses and displaces the second spring base 38. Accordingly, the return spring 39 is compressed so that energy for returning is accumulated, and when the second pilot electromagnetic valve 32b is disconnected the main valve element 27 is returned to the neutral position shown in FIG. 1, via the second spring base 38 pressed by the elastic force of the return spring 39.

In the case where both of the first and second pilot electromagnetic valves 32a, 32b are disconnected and hence the pilot air is introduced to neither of the first and second pressure chambers 31a, 31b, the return spring 39 stretches the distance between the spring bases 37, 38 so as to retain the spring bases 37, 38 at the position shown in FIG. 1, and therefore the main valve element 27 is retained at the neutral position, i.e., the closed-center position.

Here, it is not mandatory to provide the return mechanism for the main valve element 27 in the adapter block 35 between the main valve body 21 and the second piston box 30b. For example, the return mechanism may be provided in the main valve body 21.

Specific configuration and operation of the residual pressure exhaust valve 40 will now be described, with reference to FIG. 1 and FIG. 2.

The residual pressure exhaust valve 40 has its base portion 41a, on which an exhaust valve body 41 is mounted, joined onto a flat mounting seat 21a formed on the upper outer face of the main valve body 21. The mounting seat 21a includes a supply communication port 42 located at a central position and communicating with the supply flow path 23, and a first and second discharge communication ports 43a, 43b located on the respective sides of the supply communication port 42, and respectively communicating with the first and second output flow paths 24A, 24B.

A mounting surface 41b formed on the base portion 41a of the exhaust valve body 41 of the residual pressure exhaust valve 40 includes a supply via hole 44 opened at a central position so as to communicate with the supply communication port 42 of the mounting seat 21a, and a first and second residual pressure discharge via holes 45a, 45b opened on the respective sides of the supply via hole 44 so as to respectively communicate with the first and second discharge communication ports 43a, 43b. The exhaust valve body 41 is mounted on the main valve body 21 via a gasket 46 interposed between the mounting seat 21a and the mounting surface 41b.

Upon fixing the base portion 41a of the exhaust valve body 41 of the residual pressure exhaust valve 40 configured as above onto the main valve body 21, the air passage between the residual pressure exhaust valve 40 and the main valve body 21 can be secured with a simple structure.

Figure 4:
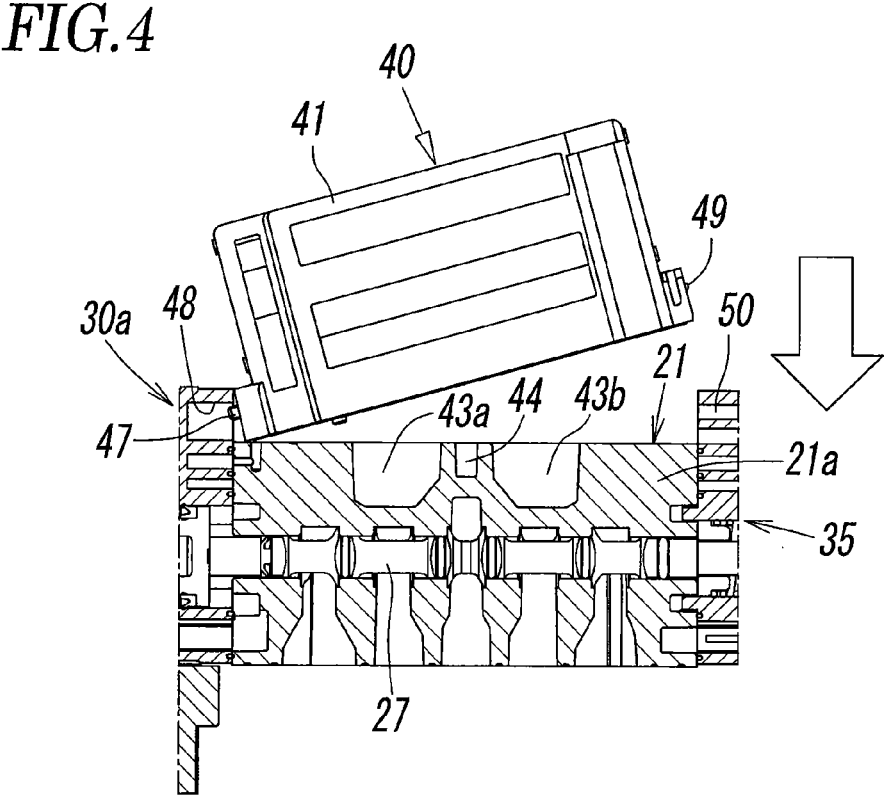
FIG. 4 is a fragmentary cross-sectional view for explaining a mounting method of the residual pressure exhaust valve according to the embodiment.

To mount the exhaust valve body 41 of the residual pressure exhaust valve 40 on the mounting seat 21a of the main valve body 21, as is apparent from FIG. 2 and FIG. 4, a projection 47 formed on the exhaust valve body 41 of the residual pressure exhaust valve 40 at an end portion on the side of the first piston box 30a is first engaged with a recessed portion 48 formed in the first piston box 30a. The residual pressure exhaust valve 40 also includes, as shown in FIG. 4, a retractable projection 49, which can elastically project and retract with respect to the exhaust valve body 41, formed at the other end portion of the exhaust valve body 41 on the side of the adapter block 35, and the exhaust valve body 41 is moved downward in the direction indicated by an arrow in FIG. 4 with the projection 47 of the exhaust valve body 41 engaged with the recessed portion 48 of the first piston box 30a, to thereby elastically engage the retractable projection 49 with a recessed portion 50 formed in the adapter block 35. However, without limitation to the mentioned method, the residual pressure exhaust valve 40 may be mounted on the mounting seat 21a of the main valve body 21 in any desired manner.

The residual pressure exhaust valve 40 includes, as shown in FIG. 1, an exhaust valve cavity 51 located inside the exhaust valve body 41 and having an axial line L1 parallel to the axial line L of the main valve cavity 22 of the main valve 20, and a first and second exhaust valve elements 53A, 53B of the same shape and size as each other and slidably placed in the exhaust valve cavity 51. The first and second exhaust valve elements 53A, 53B each include a cavity 54a formed on an end portion opposing each other, and the cavities 54a define a drive pressure chamber 54.

The exhaust valve cavity 51 includes a larger-diameter cavity 51a formed in a central portion in the direction of the axial line L1, and a smaller-diameter cavity 51b formed on the end portions in the axial line L1, the larger-diameter cavity 51a being larger in diameter than the smaller-diameter cavity 51b. The supply via hole 44 for supplying the pressure air to the drive pressure chamber 54 and the first and second residual pressure discharge via holes 45a, 45b on the respective sides of the supply via hole 44 communicate with the larger-diameter cavity 51a. The smaller-diameter cavity 51b includes a first and second residual pressure discharge flow paths 56a, 56b respectively communicating with the first and second residual pressure discharge via holes 45a, 45b via the larger-diameter cavity 51a and residual pressure outlets 56c for opening the residual pressure discharge flow paths 56a, 56b to ambient air, and also a first and second residual pressure exhaust valve seats 58a, 58b respectively surrounding the first and second residual pressure discharge flow paths 56a, 56b and formed in the inner end portions of the smaller-diameter cavity 51b.

The first and second exhaust valve elements 53A, 53B each include a larger-diameter valve 53a located in the larger-diameter cavity 51a and a smaller-diameter valve 53b located in the smaller-diameter cavity 51b, the larger-diameter valve 53a being larger in diameter than the smaller-diameter valve 53b. A lip-shaped disconnection seal member 55 that isolates the supply via hole 44 and each of the first and second residual pressure discharge via holes 45a, 45b from each other is attached to the outer periphery of each of the larger-diameter valves 53a, with the lip portion oriented to the supply via hole 44, and an O-ring shape open-close seal member 57 disposed to contact and move away from each of the residual pressure exhaust valve seats 58a, 58b is attached to the inner end portion of the smaller-diameter valve 53b.

Further, the exhaust valve element 53A, 53B includes a coil-shaped release spring 59 interposed in a compressed state between a flange-shaped spring base 65 formed on the outer periphery of each of the exhaust valve elements 53A, 53B and a stepped portion 66 formed at the boundary between the larger-diameter cavity 51a and the smaller-diameter cavity 51b, so as to constantly bias the exhaust valve elements 53A, 53B in a direction to separate the open-close seal members 57 from the residual pressure exhaust valve seats 58a, 58b. Thus, when the pressure air from the supply port P is not supplied to the drive pressure chamber 54, the exhaust valve elements 53A, 53B are respectively separated from the residual pressure exhaust valve seats 58a, 58b and abutted against each other at the central portion of the exhaust valve cavity 51.

Regarding the first and second residual pressure exhaust valve seats 58a, 58b, the first residual pressure exhaust valve seat 58a is formed on the inner wall of the exhaust valve cavity 51 in the exhaust valve body 41, while the second residual pressure exhaust valve seat 58b is formed on an inner end portion of an end member 61 constituting the residual pressure outlet 56c at the end portion of the exhaust valve cavity 51. The end member 61 is, as explicitly shown in FIG. 2, to the exhaust valve body 41 with a U-shaped clip 62 penetrating through a fixing hole 63 formed in the exhaust valve body 41 and the end member 61. In FIG. 2, a reference numeral 64 denotes a seal member that seals between the outer circumferential surface of the end member 61 and the inner circumferential surface of the exhaust valve cavity 41.

The residual pressure exhaust valve 40 configured as above works as follows. In an initial state in which the pressure air is not supplied to the supply port P of the main valve 20 as shown in FIG. 1, the first and second exhaust valve elements 53A, 53B are at an opening position in which the open-close seal members 57 are separated from the residual pressure exhaust valve seats 58a, 58b owing to the elastic force of the release spring 59, and hence the first and second residual pressure discharge flow paths 56a, 56b are open.

When the pressure air is supplied to the supply port P in the initial state, the pressure air is supplied to the drive pressure chamber 54 defined by the cavities 54a on the opposing end faces of the exhaust valve elements 53A, 53B through the supply flow path 23, the supply communication port 42 of the mounting seat 21a of the main valve body 21 and the supply via hole 44. Accordingly, the exhaust valve elements 53A, 53B are displaced from the opening position shown in FIG. 1 to a closing position overcoming the elastic force of the release spring 59, in which the open-close seal members 57 are respectively made to abut the residual pressure exhaust valve seats 58a, 58b as shown in FIG. 3, thus to close the first and second residual pressure discharge flow paths 56a, 56b. In this state, the pressure air introduced in the exhaust valve cavity 51 through the discharge communication ports 43a, 43b communicating with the output flow paths 24A, 24B and the residual pressure discharge via holes 45a, 45b is restricted from being discharged through the residual pressure outlets 56c at the end portions of the exhaust valve cavity 51.

In other words, when the pressure air is supplied to the supply port P of the main valve 20 so as to supply the air to the fluid pressure circuit connected to the first and second output ports A, B of the main valve 20, the pressure air is supplied to the drive pressure chamber 54 in the residual pressure exhaust valve 40 through the supply flow path 23 of the main valve 20, the exhaust valve elements 53A, 53B are respectively made to abut the residual pressure exhaust valve seats 58a, 58b overcoming the biasing force of the release spring 59, thus to close the residual pressure discharge flow paths 56a, 56b. Therefore, the presence of the residual pressure exhaust valve 40 does not affect the operation of the fluid pressure circuit connected to the output ports A, B of the main valve 20.

In contrast, when the air supply to the supply flow path 23 is stopped, the exhaust valve elements 53A, 53B of the residual pressure exhaust valve 40 are respectively separated from the residual pressure exhaust valve seats 58a, 58b owing to the biasing force of the release spring 59, so as to open the residual pressure discharge flow paths 56a, 56b. Therefore, the residual pressure in the fluid pressure connected to the output ports A, B of the main valve 20 is entirely discharged through the residual pressure exhaust valve 40.

Figure 5:
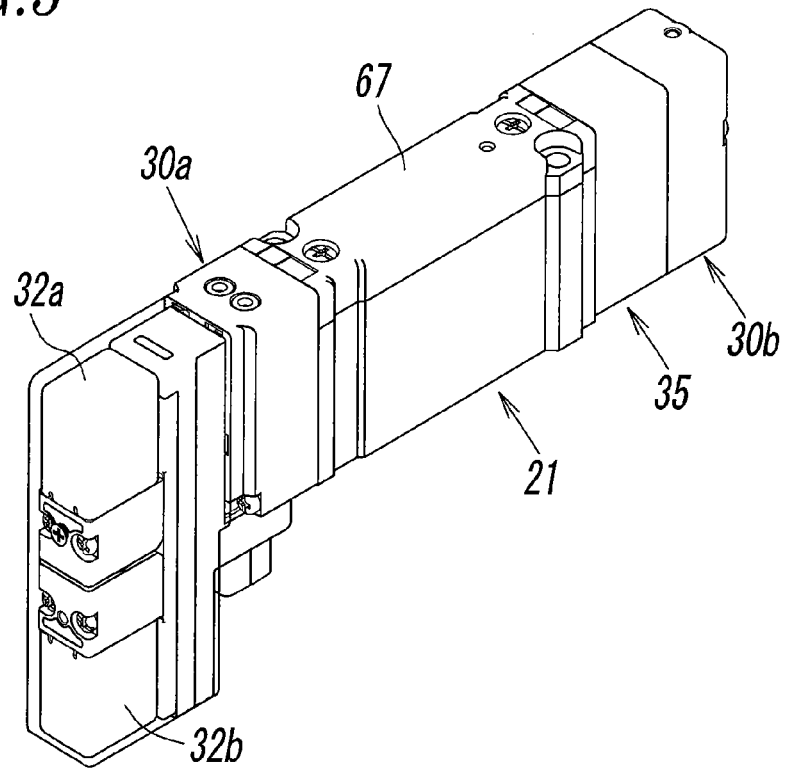
FIG. 5 is a perspective view showing the five-port switching valve according to the embodiment, with a body lid attached to the main valve body in place of the residual pressure exhaust valve.

Further, as described above, the residual pressure exhaust valve 40 can be removably attached to the main valve body 21 by engaging the projection 47 on an end portion of the exhaust valve body 41 of the residual pressure exhaust valve 40 with the recessed portion 48 in the first piston box 30a, and then elastically engaging the retractable projection 49 on the other end portion of the exhaust valve body 41 with the recessed portion 50 of the adapter block 35. Accordingly, the residual pressure exhaust valve 40 mounted on the mounting seat 21a may be removed, and instead a body lid 67 that air-tightly closes each of the communication ports of the mounting seat 21a may be replaceably attached, as shown in FIG. 5. In this case, the projection 47 and the retractable projection 49 same as those of the residual pressure exhaust valve 40 may be provided on the body lid 67, however the point is to give the same mounting structure to both the exhaust valve body 41 of the residual pressure exhaust valve 40 and the body lid 67, which enables the five-port switching valve 10 to be put to use with or without the residual pressure exhaust valve 40.

The invention claimed is:

1. A five-port switching valve with residual pressure exhaust valve, comprising:
a main valve constituted of a five-port electromagnetic switching valve settable to a closed-center position; and
a residual pressure exhaust valve attached to the main valve, wherein
the residual pressure exhaust valve includes, in an exhaust valve cavity formed in an exhaust valve body,
two residual pressure discharge flow paths respectively communicating with two output ports of the main valve so as to open the output ports to ambient air;

two exhaust valve elements configured to contact and move away from a residual pressure exhaust valve seat of the respective residual pressure discharge flow paths to open and close the respective residual pressure discharge flow paths;

a release spring that biases each of the exhaust valve elements in a direction away from the residual pressure exhaust valve seat; and a drive pressure chamber formed in the exhaust valve cavity at a position between tip end parts of the exhaust valve elements and communicating with the supply port of the main valve, both ends of the exhaust valve cavity are released to the outside, each rear end of the respective exhaust valve elements is exposed to the outside from one of opened ends of the exhaust valve cavity, when air is supplied through the supply port into the drive pressure chamber, the exhaust valve elements are
caused to contact the respective residual pressure exhaust valve seats resisting the biasing force of the release spring so as to close the residual pressure discharge flow paths, and
occupy a position where the each rear end of the respective exhaust valve elements is equivalent to the opened end of the exhaust valve cavity, and when air is not supplied through the supply port into the drive pressure chamber the exhaust valve elements are
moved away from the respective residual pressure exhaust valve seats owing to the biasing force of the release spring so as to open the residual pressure discharge flow path, and
occupy a position where the each rear end of the respective exhaust valve elements embeds inward from the opened end of the exhaust valve cavity.

2. The five-port switching valve according to claim 1, wherein
the main valve includes
the supply port located at a central position and communicating with a main valve cavity formed in a main valve body;
the output ports located on respective sides of the supply port and communicating with the main valve cavity;
two exhaust ports located on the side of respective end portions of the valve cavity from the respective output ports and communicating with the main valve cavity;
a main valve element slidably inserted in the main valve cavity;
a drive mechanism that drives the main valve element to a first switching position and a second switching position; and
a return spring that returns the main valve element to a neutral position,
in the first switching position, the supply port is set to communicate with one of the output ports and the other output port is set to communicate with one of the exhaust ports,
in the second switching position the supply port is set to communicate with the other output port and the first mentioned one of the output ports is set to communicate with the other exhaust port, and
in the neutral position all the ports are closed.

3. The five-port switching valve according to claim 2, wherein the drive mechanism includes
two pistons to be made to abut the respective end portions of the main valve element, and
two pilot electromagnetic valves that introduce pilot air into pressure chambers formed on one side of the respective pistons.

4. The five-port switching valve according to claim 2, wherein
the main valve body includes a mounting seat formed on an outer face for mounting the exhaust valve body,
a supply communication port communicating with the supply port and two discharge communication ports respectively communicating with the output ports are opened in the mounting seat,
the exhaust valve body includes a mounting surface to be made to abut the mounting seat, and
a supply via hole communicating with the supply communication port and two residual pressure discharge via holes respectively communicating with the discharge communication ports are opened in the mounting surface.

5. The five-port switching valve according to claim 2, wherein the exhaust valve cavity of the residual pressure exhaust valve and the main valve cavity of the main valve are parallel to each other.

6. A five-port switching valve with residual pressure exhaust valve, comprising:
a main valve constituted of a five-port electromagnetic switching valve settable to a closed-center position; and
a residual pressure exhaust valve attached to the main valve, wherein
the main valve includes
a main valve body including a supply port, two output ports, and two exhaust ports,
a main valve cavity formed inside the main valve body so as to allow all the ports to communicate,
a main valve element movably placed inside the main valve cavity to open and close a flow path between adjacent ones of the ports, and
pilot electromagnetic valves that drive the main valve element,
the residual pressure exhaust valve includes
an exhaust valve body attached to the main valve body,
an exhaust valve cavity formed inside the exhaust valve body,
two exhaust valve elements provided inside the exhaust valve cavity so as to oppose each other,
a supply via hole located between the exhaust valve elements so as to allow the exhaust valve cavity to communicate with the supply port,
two residual pressure discharge via holes located on respective sides of the supply via hole so as to allow communication between the respective exhaust ports and the exhaust valve cavity,
a disconnection seal member attached to each of the exhaust valve elements so as to disconnect communication between the supply via hole and one of the residual pressure discharge via holes,
two residual pressure discharge flow paths that open the respective residual pressure discharge via holes to ambient air,
residual pressure exhaust valve seats respectively formed in the residual pressure discharge flow paths and which the exhaust valve element is made to contact and move away from, and
a release spring that biases the exhaust valve element in a direction away from the residual pressure exhaust valve seat, both ends of the exhaust valve cavity are released to the outside, each rear end of the respective exhaust valve elements is exposed to the outside from one of opened ends of the exhaust valve cavity, when the exhaust valve elements are caused to contact the respective residual pressure exhaust valve seats so as to close the residual pressure discharge flow paths, the residual pressure exhaust valve is configured that the each rear end of the respective exhaust valve elements occupies a position being equivalent to the opened end of the exhaust valve cavity, and when the exhaust valve elements are moved away from the respective residual pressure exhaust valve seats so as to open the residual pressure discharge flow paths, the residual pressure exhaust valve is configured that the each rear end of the respective exhaust valve elements occupies a position to embed inward from the opened end of the exhaust valve cavity.

7. The five-port switching valve according to claim 6, wherein the exhaust valve elements each include a cavity formed on an end face opposing each other, the cavity defining a drive pressure chamber between the exhaust valve elements to introduce air from the supply port.

8. The five-port switching valve according to claim 6, wherein the exhaust valve cavity of the residual pressure exhaust valve includes a larger-diameter cavity located at a central portion in a direction of an axial line and two smaller-diameter cavities located at respective end portions in the direction of the axial line, the larger-diameter cavity being larger in diameter than the smaller-diameter cavities, the supply via hole and the residual pressure discharge via holes communicate with the larger-diameter cavity, the smaller-diameter cavities respectively include the residual pressure discharge flow paths, the residual pressure exhaust valve seats are formed in an inner end portion of the respective smaller-diameter cavities, the exhaust valve elements each include a larger-diameter valve placed in the larger-diameter cavity and a smaller-diameter valve placed in the smaller-diameter cavity, the larger-diameter valve being larger in diameter than the smaller-diameter valve, the disconnection seal member is attached to an outer periphery of the larger-diameter valve, and an open-close seal member to be made to contact and move away from the residual pressure exhaust valve seat is attached to an inner end portion of the smaller-diameter valve.

9. The five-port switching valve according to claim 6, wherein the main valve body includes a mounting seat formed on an outer face for mounting the exhaust valve body, the mounting seat including an opening of a supply communication port communicating with the supply port, and an opening of each of two discharge communication ports respectively communicating with the output ports, and the exhaust valve body includes a mounting surface to be made to abut the mounting seat, the mounting surface including an opening of the supply via hole communicating with the supply communication port, and an opening of each of the residual pressure discharge via holes respectively communicating with the discharge communication ports.

* * * * *